UNITED STATES PATENT OFFICE.

JAMES HENRY REID, OF NEWARK, NEW JERSEY.

PROCESS OF SECURING POTASSIUM CYANID FROM WATER-INSOLUBLE POTASSIUM CONTAINING MINERAL.

1,226,811.

Specification of Letters Patent. Patented May 22, 1917.

No Drawing. Application filed September 30, 1915. Serial No. 53,302.

*To all whom it may concern:*

Be it known that I, JAMES HENRY REID, a citizen of the United States, residing at 352 Mulberry avenue, in the city of Newark, county of Essex, State of New Jersey, have invented certain new and useful Improvements in Processes of Securing Potassium Cyanid from Water-Insoluble Potassium-Containing Mineral, of which the following is a specification.

This invention relates to the making and separation of potassium cyanid from water-insoluble potash bearing minerals, such as the silicious combinations of potassium of compound, composite or complex silicate nature and has for its object the making and securing of soluble potassium compounds from feldspar of the orthoclase or other variety or other potash bearing minerals such as microcline, leucite, muscovite (potash mica), etc., and comprises subjecting the potash bearing mineral to the action of chemical re-agents capable of transforming the potassium content into cyanid volatilizable at elevated temperatures and subjecting the composition to internal electrical disruption and augmenting the chemical reaction in the production of the desired product by the action of an electric current so disposed and controlled as to produce the desired product and volatilize the same and then after volatilization separating and securing the volatilized potassium cyanid from the associated gaseous vehicle by the action of electricity of such character as to cause the potassium compounds to be precipitated and separated therefrom.

In carrying out the invention, the making and separation of potassium cyanid from orthoclase or potash feldspar will be taken.

Orthoclase, which is a double silicate of potassium and aluminium carrying free silica, is taken and reduced to a fine powdered condition. To this is added calcium carbid in excess of molecular proportion to react with the potassium silicate content and convert the same in the presence of nitrogen, when heated, into calcium silicate and potassium cyanid. To the orthoclase is added also about 10% of potassium cyanid initially for the purpose of fluxing the material.

An electric current is then passed through the mixture of sufficient volume and intensity to transform the silicious potassium compound into cyanid and elevate the temperature to a point at which the potassium cyanid volatilizes. This volatilized potassium cyanid associated with air or other gaseous products passes out from the material being acted upon and is separated by condensing induced or augmented by electricity or what may be termed electro-condensation.

This operation may be augmented by a current of nitrogen preferably pre-heated being caused to circulate in contact with the reactive ingredients which facilitates the volatilization of the potash compound and carrying of the same to a point where it is condensed and collected.

Instead of employing an indirect chemically reacting substance capable of transforming the potassium silicate into volatile potassium cyanid, substances which may react directly to produce the volatile potassium cyanid may be employed such as associating feldspar of the potash bearing variety with calcium cyanid and passing nitrogen over or through the same in a heated condition whereby potassium cyanid may be produced or yielded and finally secured through volatilization and electro-condensation. In this case the initial passing of electricity through the mixture to overcome resistance is carried by the carbid which performs this function itself.

The electro-condensation or precipitation of the volatilized potassium cyanid is accomplished by subjecting the vapor of the volatilized material to the discharge or action of electricity of high tension character whereby the particles of potassium cyanid are caused to rush together and become condensed and precipitated by electrical action, similarly to that which occurs in the electrical precipitation and separation of smoke from products of combustion or fog from the atmosphere.

After the current of electricity is passed through the material initially and the material becomes heated, the heated product gradually increases in its conductivity so that the operation may be carried on without further augmenting the same by a substance, such as carbid, capable of reducing resistance, after fusion the operation may be carried on by passing a current of electricity therethrough and adding further ingredients to the fused material in proportion not sufficient to cool the same below a point of its superior electrical conductivity.

In the production of potassium cyanid other water-insoluble minerals or substances containing insoluble potassium compounds than orthoclase may be employed, among which may be mentioned, muscovite or potash mica, leucite, which is a species of feldspar containing less silicon than orthoclase. Also insoluble phosphates, fluo-phosphates, and fluorids, such as amblygonite, triphylite, cryolite, and other compounds containing alkali-metal in an insoluble form can be employed instead of silicates, as materials from which to produce a separate potassium cyanid by the process herein described and are intended to be included and claimed herein as part of the invention.

It is obvious that the proportion of calcium cyanid, calcium carbid and nitrogen, or other compound employed to dislodge, displace or transform the potassium from its insoluble compound or composition may be varied in accordance with the character of the potassium or alkali-metal compound to be transformed, the potassium or alkali-metal compound produced, and the mineral operated on, also with reference to the amount of potassium or alkali-metal silicate and free silica present, all of which should be ascertained before commencing the operation.

It will be noted that the transformation of potash of alkali-metal bearing silicate or other mineral is carried on by the action of internal dry heat or by the action of electricity on the materials while in an anhydrous condition and that the separation, delivery and securing of the potassium or alkali-metal compound produced is obtained by volatilizing the product and precipitating the same at a point distant from the point of production and by the action of electro-condensation acting upon the potassium or alkali-metal compound vapor or sublimate *per se*, or while suspended and associated with other dry fluids of gaseous or vaporous nature.

By acting on the material through the agency of a current of electricity passed therethrough the material is internally heated uniformly with the exterior and the volatile ingredients evolved, driven out and discharged therefrom from the interior outward and the conversion or transformation is brought about and carried on more rapidly and perfectly and also the material is more readily evolved and discharged by volatilization than if the material were heated from the outside inward resulting in various zones or spheres of differing temperature from the outside inward the material itself being a non-conductor of heat.

Having now described my invention what I claim is:—

1. The process of making and securing potassium cyanid from water-insoluble potassium containing mineral, which comprises exposing the potassium containing mineral with a carbid and nitrogen capable of reacting and forming potassium cyanid thereto, and exposing the ingredients to the action of an electric current of sufficient volume and intensity to induce reaction and volatilize the product.

2. The process of making and securing potassium cyanid from water-insoluble potassium containing mineral, which comprises exposing the potassium containing mineral with a carbid and nitrogen capable of reacting and forming potassium cyanid, to the action of an electric current of sufficient volume and intensity to induce reaction and volatilize the product, and finally collecting the volatilizable potassium compound from the associated gaseous vehicle by electro-condensation.

3. The process of making and securing potassium cyanid from potassium silicate containing mineral, which comprises mixing the potassium silicate containing mineral with a carbid and nitrogen capable of reacting and forming potassium cyanid thereto, and exposing the ingredients to the action of an electric current of sufficient volume and intensity to induce reaction and volatilize the product.

4. The process of making and securing potassium cyanid from potassium silicate containing mineral, which comprises mixing the potassium silicate containing mineral with a carbid and nitrogen capable of reacting and forming potassium cyanid thereto, and exposing the ingredients to the action of an electric current of sufficient volume and intensity to induce reaction and volatilize the product, and finally collecting the volatilizable potassium compound from the associated gaseous vehicle by electro-condensation.

5. The process of making and securing potassium cyanid from feldspar, which comprises mixing the feldspar with a carbid and supplying nitrogen capable of reacting and forming potassium cyanid thereto, and exposing the ingredients to the action of an electric current of sufficient volume and intensity to induce reaction and volatilize the product.

6. The process of making and securing potassium cyanid from feldspar, which comprises mixing the feldspar with a carbid and supplying nitrogen capable of reacting and forming potassium cyanid thereto, and exposing the ingredients to the action of an electric current of sufficient volume and intensity to induce reaction and volatilize the product, and finally collecting the volatilizable potassium compound from the associated gaseous vehicle by electro-condensation.

7. The process of making and securing potassium cyanid from orthoclase, which comprises mixing the orthoclase with a carbid and supplying nitrogen capable of reacting and forming potassium cyanid thereto, and exposing the ingredients to the action of an electric current of sufficient volume and intensity to induce reaction and volatilize the product.

8. The process of making and securing potassium cyanid from orthoclase, which comprises mixing the orthoclase with a carbid and supply nitrogen capable of reacting and forming potassium cyanid thereto, and exposing the ingredients to the action of an electric current of sufficient volume and intensity to induce reaction and volatilize the product, and finally collecting the volatilizable potassium compound from the associated gaseous vehicle by electro-condensation.

9. The process of making and securing potassium cyanid from water-insoluble potassium containing mineral, which comprises exposing the potassium containing mineral with a calcium carbid and nitrogen capable of reacting and forming potassium cyanid thereto, and exposing the ingredients to the action of an electric current of sufficient volume and intensity to induce reaction and volatilize the product.

10. The process of making and securing potassium cyanid from water-insoluble potassium containing mineral, which comprises exposing the potassium containing mineral with a calcium carbid and nitrogen capable of reacting and forming potassium cyanid thereto, and exposing the ingredients to the action of an electric current of sufficient volume and intensity to induce reaction and volatilize the product, and finally collecting the volatilizable potassium compound from the associated gaseous vehicle by electro-condensation.

11. The process of making and securing potassium cyanid from potassium silicate containing mineral, which comprises mixing the potassium silicate containing mineral with a calcium carbid and nitrogen capable of reacting and forming potassium cyanid thereto, and exposing the ingredients to the action of an electric current of sufficient volume and intensity to induce reaction and volatilize the product.

12. The process of making and securing potassium cyanid from potassium silicate containing mineral, which comprises mixing the potassium silicate containing mineral with a calcium carbid and nitrogen capable of reacting and forming potassium cyanid thereto, and exposing the ingredients to the action of an electric current of sufficient volume and intensity to induce reaction and volatilize the product, and finally collecting the volatilizable potassium compound from the associated gaseous vehicle by electro-condensation.

13. The process of making and securing potassium cyanid from feldspar, which comprises mixing the feldspar with a calcium carbid and supplying nitrogen capable of reacting and forming potassium cyanid thereto, and exposing the ingredients to the action of an electric current of sufficient volume and intensity to induce reaction and volatilize the product, and finally collecting the volatilizable potassium compound from the associated gaseous vehicle by electro-condensation.

14. The process of making and securing potassium cyanid from orthoclase, which comprises mixing the orthoclase with a calcium carbid and supplying nitrogen capable of reacting and forming potassium cyanid thereto, and exposing the ingredients to the action of an electric current of sufficient volume and intensity to induce reaction and volatilize the product.

15. The process of making and securing potassium cyanid from feldspar, which comprises mixing the feldspar with a calcium carbid and supplying nitrogen capable of reacting and forming potassium cyanid thereto, and exposing the ingredients to the action of an electric current of sufficient volume and intensity to induce reaction and volatilize the product.

16. The process of making and securing potassium cyanid from orthoclase, which comprises mixing the orthoclase with a calcium carbid and supplying nitrogen capable of reacting and forming potassium cyanid thereto, and exposing the ingredients to the action of an electric current of sufficient volume and intensity to induce reaction and volatilize the product, and finally collecting the volatilizable potassium compound from the associated gaseous vehicle by electro-condensation.

In testimony whereof, I affix my signature in presence of two witnesses.

JAMES HENRY REID. [L. s.]

Witnesses:
CHARLES P. SWETT,
ERNEST H. BALL.